(12) United States Patent
Coles

(10) Patent No.: US 7,102,266 B2
(45) Date of Patent: Sep. 5, 2006

(54) MOTOR ASSEMBLY WITH A SEALED COMMUTATOR/BRUSH INTERFACE

(75) Inventor: Michael Coles, Kent, OH (US)

(73) Assignee: Ametek, Inc., Kent, OH (US)

( * ) Notice: Subject to any disclaimer, the term of this patent is extended or adjusted under 35 U.S.C. 154(b) by 0 days.

(21) Appl. No.: 11/054,666

(22) Filed: Feb. 8, 2005

(65) Prior Publication Data

US 2006/0175925 A1    Aug. 10, 2006

(51) Int. Cl.
H01R 39/38    (2006.01)

(52) U.S. Cl. .................. 310/239; 310/88; 310/233; 310/220

(58) Field of Classification Search ........ 310/219–247, 310/85, 88, 90
See application file for complete search history.

(56) References Cited

U.S. PATENT DOCUMENTS

| | | | |
|---|---|---|---|
| 2,744,205 A | 5/1956 | Kalikow | 310/228 |
| 3,233,130 A | 2/1966 | Bates | 310/88 |
| 3,243,618 A | 3/1966 | Ward | 310/88 |
| 3,673,447 A | 6/1972 | Zumbach et al. | 310/227 |
| 3,731,126 A | 5/1973 | Hagenlocher et al. | 310/68 |
| 3,776,559 A | 12/1973 | Cawthorn | 277/56 |
| 3,919,574 A | 11/1975 | Schmuck | 310/68 |
| 4,464,593 A | 8/1984 | Kofink | 310/58 |
| 4,476,410 A | 10/1984 | Wolcott | 310/228 |
| 4,538,085 A | 8/1985 | Tanaka | 310/239 |
| 4,546,280 A | 10/1985 | Pfluger | 310/68 |
| 4,574,212 A | 3/1986 | Haijkens | 310/88 |
| 4,626,720 A | 12/1986 | Fukasaku et al. | 310/62 |
| 4,680,495 A | 7/1987 | Chiampas et al. | 310/220 |
| 4,689,507 A | 8/1987 | Baker et al. | 310/62 |
| 4,730,135 A | 3/1988 | Dolderer et al. | 310/68 |
| 4,766,337 A | 8/1988 | Parkinson et al. | 310/58 |
| 4,820,948 A * | 4/1989 | Rogelein | 310/90 |
| 4,908,538 A | 3/1990 | Geberth | 310/59 |
| 5,004,943 A | 4/1991 | Gagneux | 310/239 |
| 5,132,580 A | 7/1992 | Aoki et al. | 310/239 |
| 5,185,544 A * | 2/1993 | Takada | 310/58 |
| 5,291,087 A | 3/1994 | Pollick et al. | 310/86 |
| 5,345,132 A | 9/1994 | Sasaki et al. | 310/239 |
| 5,683,184 A | 11/1997 | Striedacher et al. | 384/138 |
| 5,864,194 A | 1/1999 | Okamoto et al. | 310/239 |
| 6,008,556 A * | 12/1999 | Ramthun | 310/88 |
| 6,008,557 A * | 12/1999 | Dornhoefer et al. | 310/90 |
| 6,097,128 A * | 8/2000 | Ko | 310/239 |
| 6,100,617 A | 8/2000 | Carter et al. | 310/90 |
| 6,417,595 B1 | 7/2002 | Wasson | 310/220 |

* cited by examiner

*Primary Examiner*—Dang Le
(74) *Attorney, Agent, or Firm*—Renner, Kenner, Greive, Bobak, Taylor & Weber

(57) ABSTRACT

A motor assembly includes a commutator having a shaft extending axially therefrom, a commutator end bracket assembly, and at least two brushes carried by the commutator end bracket assembly and in contact with the commutator. A seal is carried by either the commutator or the commutator end bracket assembly and has engaging contact with the other. The seal may be disposed on either or both sides of the commutator.

26 Claims, 7 Drawing Sheets

MOTOR ASSEMBLY WITH A SEALED COMMUTATOR/BRUSH INTERFACE

TECHNICAL FIELD

The present invention is generally directed to motor assemblies. In particular, the present invention is directed to a sealed commutator/brush interface area of a motor assembly so as to preclude entry of volatile material into the interface area and contain carbon dust. Specifically, the present invention is related to a motor assembly which employs seals around the commutator/brush interface so as to contain carbon dust generated from the brush in a confined area so as to eliminate the possibility of arcing between the brushes and a shaft bearing or a motor housing.

BACKGROUND ART

It is well known that carbon brushes utilized in motor assemblies wear and generate carbon dust after prolonged motor use. Indeed, carbon dust is generated that migrates to various areas around the motor assembly. This is problematic in that some motor assemblies are used to pump or move highly volatile organic compounds such as paint. The commutator brush interface causes sparking which in turn generates carbon dust. An accumulation of carbon dust may result in arcing between the interface area and the motor shaft or motor housing. The potential arcing in an environment of volatile organic compounds presents a significant safety hazard for those in proximity to the motor assembly. Yet another drawback of the carbon dust generation is that the dust migrates toward the bearings supporting the motor shaft. This dust may create an electrical shorting path and if this occurs the motor is damaged and rendered inoperative.

One attempt at solving the problem of sparking highly combustible materials is presented in U.S. Pat. No. 6,417,595. This patent discloses a seal that partially isolates the commutator assembly from the internal ambient atmosphere of the electric motor. However, the disclosed seal still provides gaps to allow migration of the carbon dust and as such sparking may still occur. Yet another problem with the assembly disclosed in the '595 patent and other similar assemblies, is that the carbon brush dust tends to collect in unwanted areas. Therefore, there is a need for an improved system to seal carbon dust within a confined area and prevent its migration to other areas of the motor assembly.

SUMMARY OF THE INVENTION

In view of the foregoing, it is a first aspect of the present invention to provide a motor assembly with a sealed commutator/brush interface.

Another aspect of the present invention, which shall become apparent as the detailed description proceeds, is achieved by a motor assembly, comprising a commutator having a shaft extending axially therefrom, a commutator end bracket assembly, at least two brushes carried by the commutator end bracket assembly and in contact with the commutator, and a seal carried by one of the commutator and the commutator end bracket assembly and having engaging contact with the other of the commutator and the commutator end bracket.

Still another aspect of the present invention is to provide a motor assembly comprising a commutator having a shaft extending axially therefrom, an armature assembly affixed to the shaft, a commutator end bracket assembly, at least two brushes carried by the commutator end bracket assembly and in contact with the commutator, and a seal carried by one of the commutator and the commutator end bracket assembly and having engaging contact with the other of the commutator and the commutator end bracket assembly, the seal disposed between the at least one brush and the armature assembly.

Yet another aspect of the present invention is attained by a motor assembly comprising a commutator having a shaft extending axially therefrom, a commutator end bracket assembly, a bearing disposed between the shaft and the commutator end bracket assembly, at least two brushes carried by the commutator end bracket assembly and in contact with the commutator, and a seal carried by one of the commutator and the commutator end bracket assembly and having engaging contact with the other of the commutator and the commutator end bracket assembly, the seal disposed between the at least two brushes and the bearing.

Other aspects of the present invention are attained by a motor assembly, comprising a commutator having a shaft extending axially therefrom, a commutator end bracket assembly, an armature assembly affixed to the shaft, a bearing disposed between the shaft and the commutator end bracket assembly, at least two brushes carried by the commutator end bracket assembly and in contact with said commutator, a commutator/bearing seal carried by one of the commutator and the commutator end bracket assembly and having engaging contact with the other of the commutator and the commutator end bracket assembly the seals, and the commutator end bracket assembly forming an enclosed chamber for collecting dust from the brush.

Still further aspects of the present invention are attained by a motor assembly, comprising a commutator having a shaft extending axially therefrom, a commutator end bracket assembly, a bearing disposed between the shaft and the commutator end bracket assembly, at least two brushes carried by the commutator end bracket assembly and in contact with the commutator, a first seal disposed between the commutator and the commutator end bracket assembly proximal the bearing, a second seal disposed between the commutator and the commutator end bracket assembly proximal the armature assembly, the seals, the commutator end bracket assembly and the commutator effectively forming a chamber, and the chamber having at least one dust reservoir for retaining dust from the brushes.

BRIEF DESCRIPTION OF THE DRAWINGS

For a complete understanding of the objects, techniques and structure of the invention, reference should be made to the following detailed description and accompanying drawings, wherein.

BEST MODE FOR CARRYING OUT THE INVENTION

Figure 1:
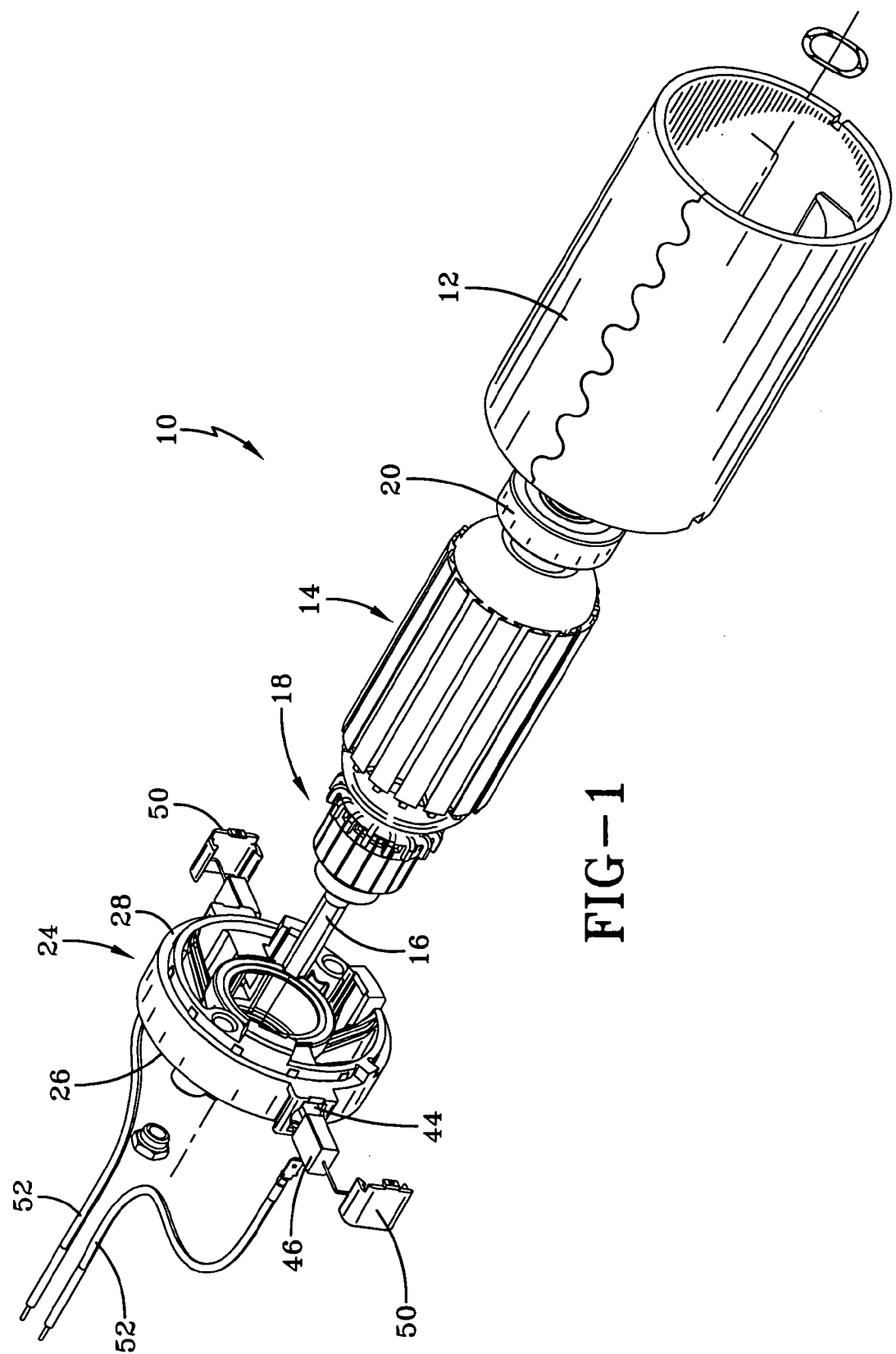
FIG. 1 is an exploded perspective view of a motor assembly made in accordance with the concepts of the present invention.

Referring now to the drawings and in particular to FIG. 1 it can be seen that a motor assembly with a sealed commutator/brush interface is designated generally by the numeral 10. Although the motor assembly described herein is used primarily for paint sprayers and the like, it will be appreciated that the concepts disclosed herein are equally applicable to other types of motor assemblies. And the motor described herein is a 2-pole motor. Of course, the aspects described herein are equally applicable to 4-pole or other multiple pole motor assemblies. The motor assembly 10 includes a housing 12 which encloses an armature assembly 14. Axially extending from the armature assembly is a rotatable shaft 16 that carries a commutator 18. A distal bearing 20 is carried by one end of the shaft 16 for rotatable support of the armature assembly within the housing 12. A commutator end bracket assembly 24 rotatably receives an end of the shaft 16 opposite the distal bearing 20. The commutator end bracket assembly 24 includes a bearing side 26 which is opposite a housing side 28. The housing side 28 is received by and mates with the housing 12 and is supported thereby.

Figure 2:
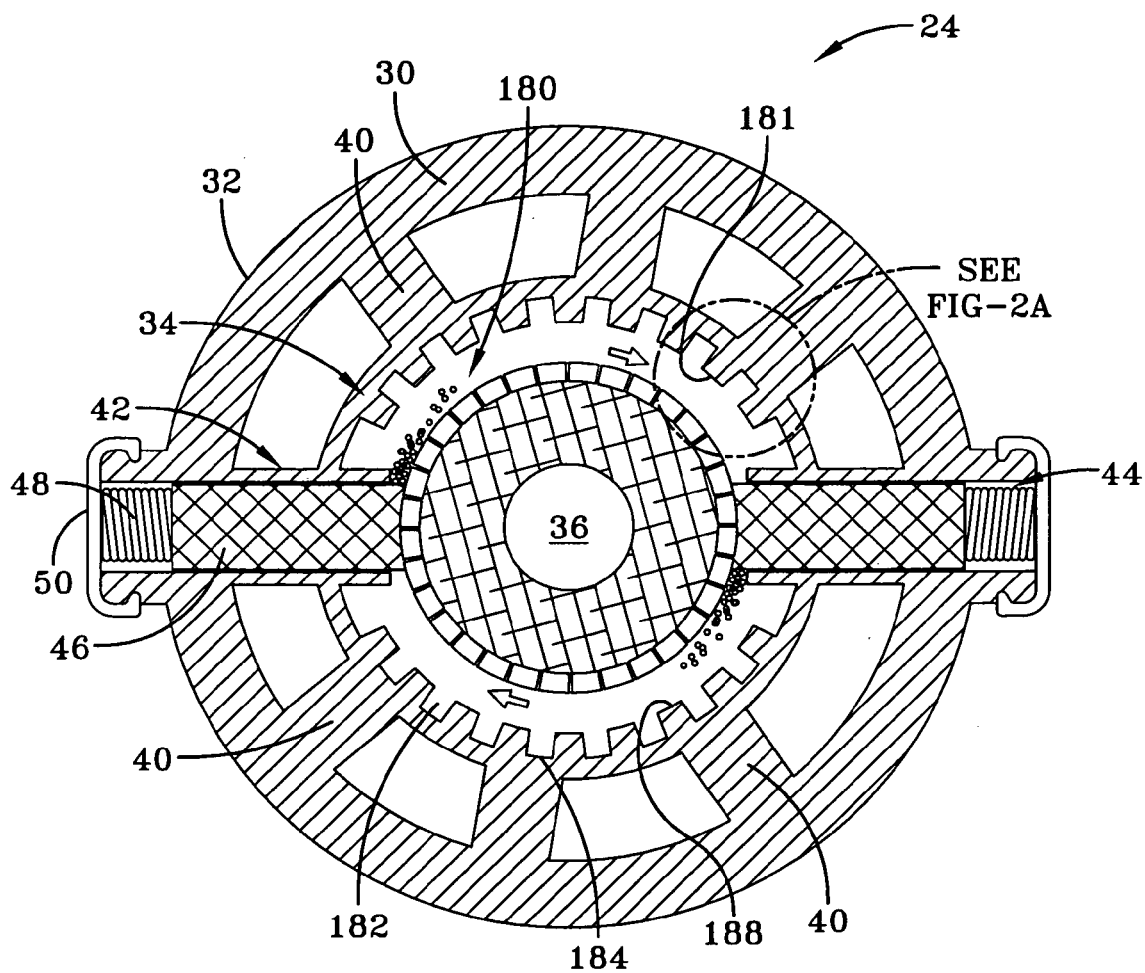
FIG. 2 is a cross-sectional view of an end bracket assembly provided in the motor assembly and made in accordance with the concepts of the present invention.
Figure 2A:
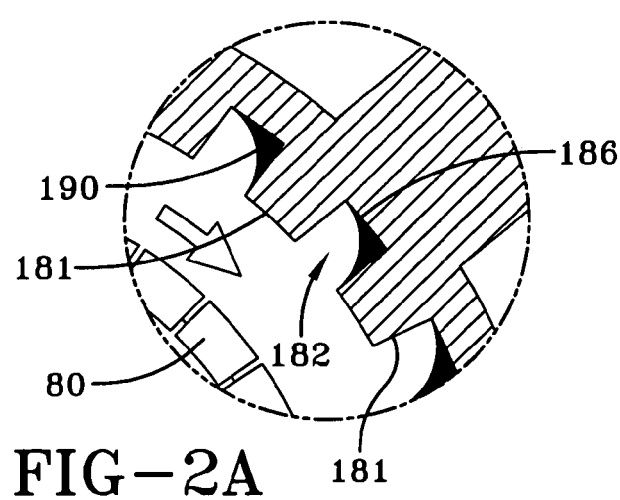
FIG. 2A is a detailed view of an inner ring of the end bracket assembly.

As best seen in FIG. 2, the end bracket assembly 24 includes an outer ring 30 which has an outer ring surface 32. Concentrically disposed within the outer ring 30 is an inner ring 34. The inner ring 34 may be axially displaced with respect to the outer ring 30 away from the housing so as to accommodate components of the commutator 18. The inner ring 34 provides an axial opening 36 therethrough so as to rotatably receive the commutator 18. A plurality of radial ribs 40 angularly and axially extend between the outer ring 30 and the inner ring 34.

A pair of diametrically opposed brush tubes 42 also connect the outer ring 30 to the inner ring 34. Each brush tube 42 has a brush opening 44 to receive a brush 46. A pair of brushes are used in this embodiment and as such the motor assembly 10 is a two-pole motor. It will be appreciated that the brushes 46 may be made of carbon, a carbon composite material or other like material that is used for brushes in electric motor assemblies. The brushes allow for electrical connection to a rotatable component—the commutator—so as to generate rotation of the shaft when electricity is applied to the brushes 46. Also contained within the brush tubes 42 are springs 48 that bias the brush against the commutator 18. Each brush tube is enclosed at the end opposite the commutator by a brush cap 50 which also provides for connection of a power lead 52 to the spring which is mechanically and electrically connected to the brushes 46. It will be appreciated that as the commutator is rotated and bears against the ends of the brushes 46 that the frictional interaction between the two surfaces causes sparking and brush dust to be generated from the brushes. In order to minimize migration of the dust, which causes the problems previously discussed, it is desirable to confine that dust within the area defined by the inner ring 34.

Referring now to FIGS. 3–7, it can be seen that various embodiments are presented which enable sealing of the area defined by the inner ring or at least precludes migration of the dust toward other motor assembly components. And such a seal prevents or at least significantly reduces the ability of volatile ambient air from entering the inner ring. Each of these embodiments incorporate some type of modification to the end bracket assembly. Accordingly, all the common details of the end bracket assembly will be discussed in the presentation of FIG. 3 and specific features will then be presented in FIGS. 3–7. Moreover, it will be appreciated the any one of the embodiments disclosing a "commutator seal" in FIGS. 3 and 4, may be combined with any one of the "bearing seal" embodiments disclosed in FIGS. 5–7 to enclose the area substantially formed by the inner ring.

Among the common components in the end bracket assembly 24 is a downwardly axially extending rim 54. The rim 54 is received within the housing and facilitates assembly of the end bracket to the housing. The rim may be frictionally received and/or mechanically fastened to the housing 12. A plurality of magnets 56 are disposed within the interior of the housing and are utilized in the operation of the motor.

The armature assembly 14 includes a lamination stack 58 that is secured to the shaft 16 and disposed in a positional relationship with the magnets 56 in a manner well known in the art. An insulator 60 is disposed on a lamination in the stack 58 closest to the bracket assembly and a portion of the shaft 16. In particular, the insulator 60 includes a leg 62 which is disposed on the uppermost lamination and a body 64 which is disposed around the shaft 16. The insulator 60 rotates as the shaft rotates.

The commutator 18, which is also secured to the shaft 16, includes a core 70 that is manufactured from an insulating molded plastic material. The core 70 includes a radial face surface 71 that faces the end bracket assembly and an exterior surface 72 that faces the brush assemblies. In particular, the core 70 includes a sleeve 74 from which axially extends toward the lamination stack 58 a collar 76. The collar 76 and the shaft 16 form a gap 78 therebetween that extends past and covers a portion of the insulator body 64. Radially disposed about the sleeve 74 and the collar 76 are a plurality of commutator bars 80 which are inset into the exterior surface 72. Each commutator bar 80 has a tang 82 which is electrically and mechanically connected to a wire winding 84. It will be appreciated that the commutator bars 80 are in selective engaging contact with the brushes 46 as the commutator rotates.

The end bracket assembly 24, proximal the bearing side 26, provides an axial bracket opening 90 therethrough. The opening 90 is defined by an internal surface 92 from which an internal ledge 94 extends radially inwardly. An end bearing 96 is received in the opening 90 and is supported by the internal surface 92 and the internal ledge 94. In particular, the end bearing 96 includes an outer race 98 that is supported by the ledge and an inner race 100 that rotatably receives the shaft 16.

Figure 3:
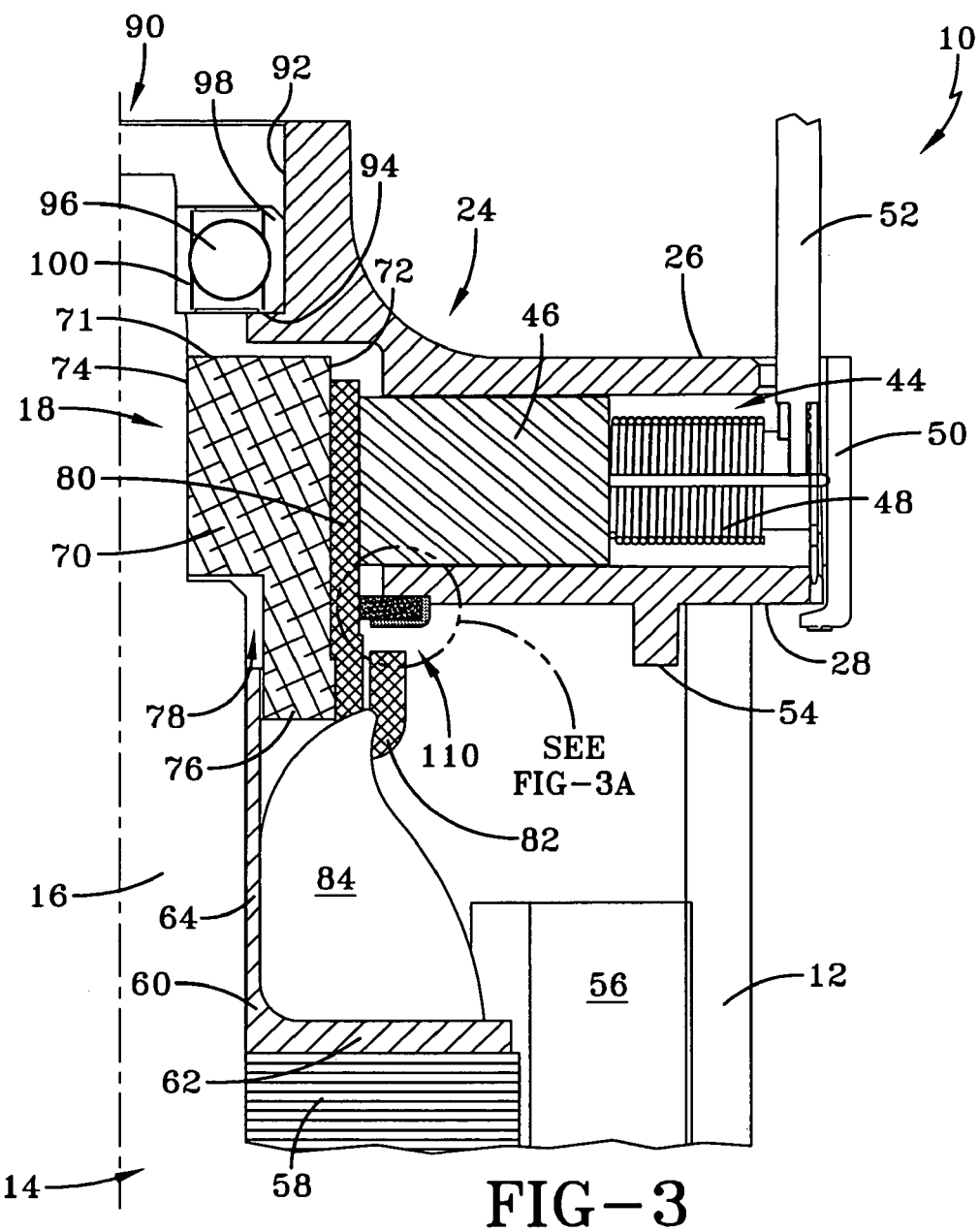
FIG. 3 is a partial cross-sectional view of the end bracket assembly incorporating a commutator seal.
Figure 3A:
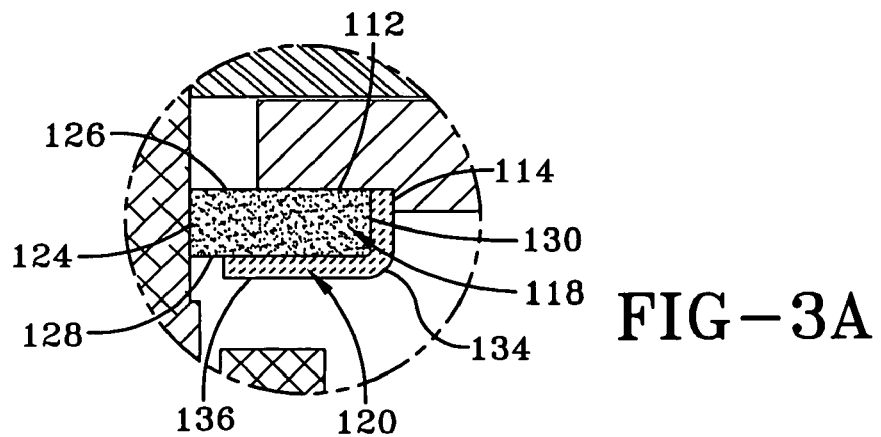
FIG. 3A is a detailed illustration of the commutator seal.

As seen in detail in FIGS. 3 and 3A, a commutator/armature seal is designated generally by the numeral 110. The commutator seal 110 effectively closes any gaps between the end bracket assembly and in particular the housing side 28 and the commutator 18. The housing side 28 includes a notch 112 that is formed on an inner periphery of the inner ring and along an end of the brush tube 42 that is adjacent the commutator bars. The notch 112 includes a step surface 114. A seal ring 118 is received by the notch 112 and is retained by a seal cover 120. In other words, the seal cover 120 mechanically retains and holds in place the seal ring adjacent the end bracket assembly. The seal ring 118 may be manufactured from any commercially available polymeric material. It has been found that the use of expanded polytetrafluoroethylene for the seal ring 118 provides the optimum properties of wear resistance and heat resistance in this particular application. The seal ring 118 includes an inner radial surface 124 that contacts the plurality of commutator bars as they rotate. The seal ring provides a bracket surface 126 on one side and a cover surface 128 on an opposite side that is connected internally by the inner radial surface 124 and externally by an outer radial surface 130. Accordingly, with the seal ring 118 secured by the seal cover 120, the inner radial surface 124 is in bearing contact with the commutator bars while the bracket surface is held adjacent the housing side 28, and in particular, the notch 112.

The seal cover 120 may be made of a pliable metallic or plastic material which secures the seal in place. Of course, the seal may be secured to the underside of the bracket assembly using other types of fasteners such as adhesive, screws, staples, rivets and the like. The seal cover 120 includes an edge 134 from which extends a plate 136. The edge 134 fits within the notch 112 and is adjacent the step surface 114. The plate 136 is adjacent the cover surface 128, but does not make contact with the rotating commutator bars. As such, the inner radial surface 124 of the seal prevents migration of dust from the brush and plurality of commutator bars into the internal cavity formed by the motor housing 12. Therefore, dust is precluded from migrating toward the armature assembly including the lamination stack, the windings, the magnet or any other conductive area of the motor assembly.

Figure 4:
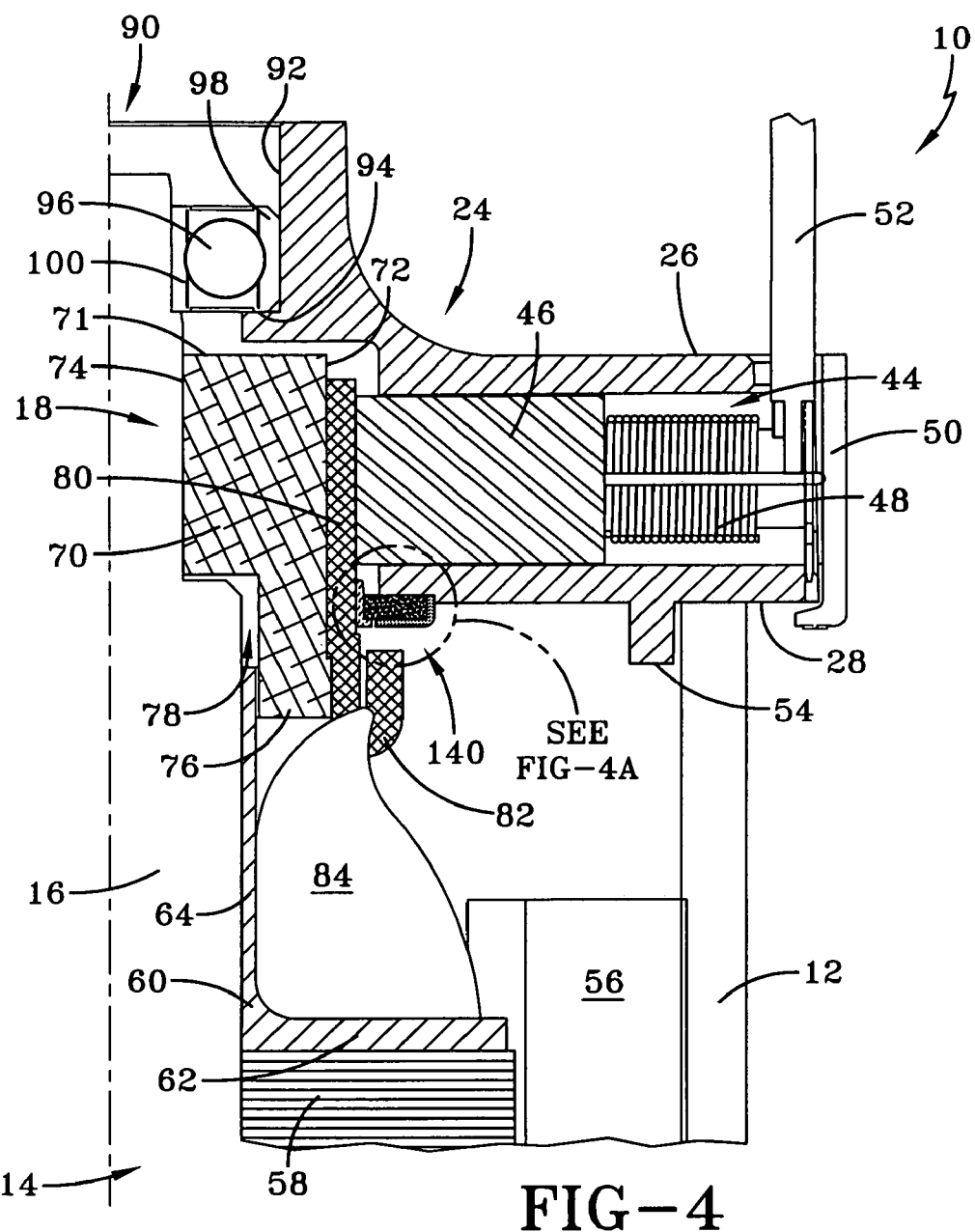
FIG. 4 is a partial cross-sectional view of the end bracket assembly incorporating an alternative commutator seal.
Figure 4A:
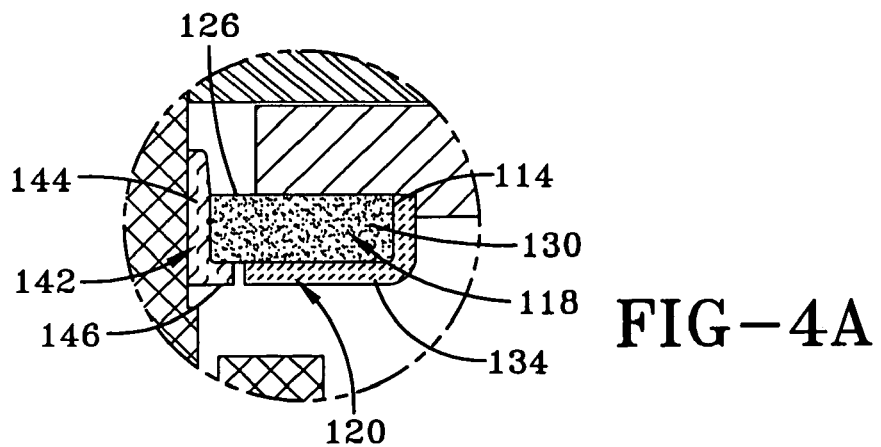
FIG. 4A is a detailed illustration of the alternative commutator seal.

Referring now to FIGS. 4 and 4A, it will be appreciated that the structural components of the end bracket assembly are substantially the same as shown in FIGS. 3 and 3A. This alternative embodiment employs an alternative commutator/armature seal designated generally by the numeral 140 which is distinguished by the use of a seal seat 142 that is secured to the commutator and fills in the gaps between the plurality of commutator bars 80. It will be appreciated that the seal seat 142 is an insulated material and as such does not provide for any electrical conduction between the commutator bars. The seal seat 142 includes a seat sleeve 144 that is disposed along an axial portion of the commutator bars and from which radially extends a seat lip 146. This embodiment also utilizes the seal ring 118 and the seal cover 120 in a similar manner as shown in FIG. 3; however, the inner radial surface 124 slidably engages the seat sleeve 144 and/or the seat lip 146 as the commutator rotates. As such, this configuration is believed to provide a better seal inasmuch as no dust can migrate between the gaps that may be provided between the plurality of commutator bars.

Figure 5:
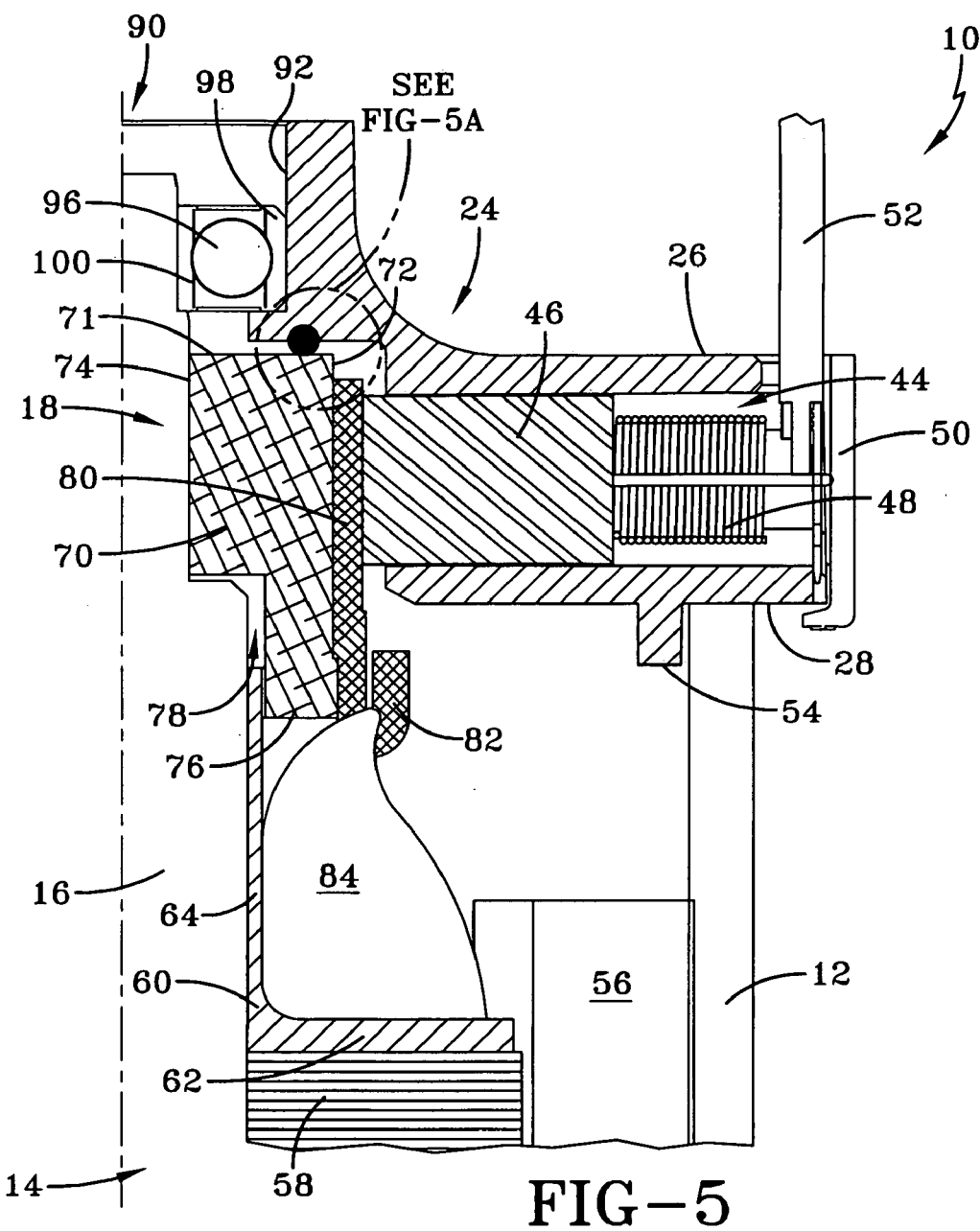
FIG. 5 is a partial cross-sectional view of the end bracket assembly incorporating a bearing seal.
Figure 5A:
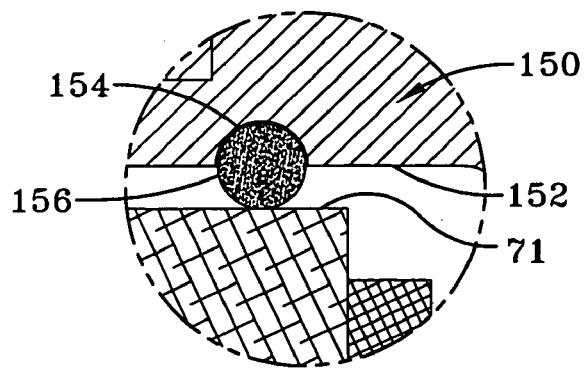
FIG. 5A is a detailed illustration of the bearing seal.
Figures 6, 6A:
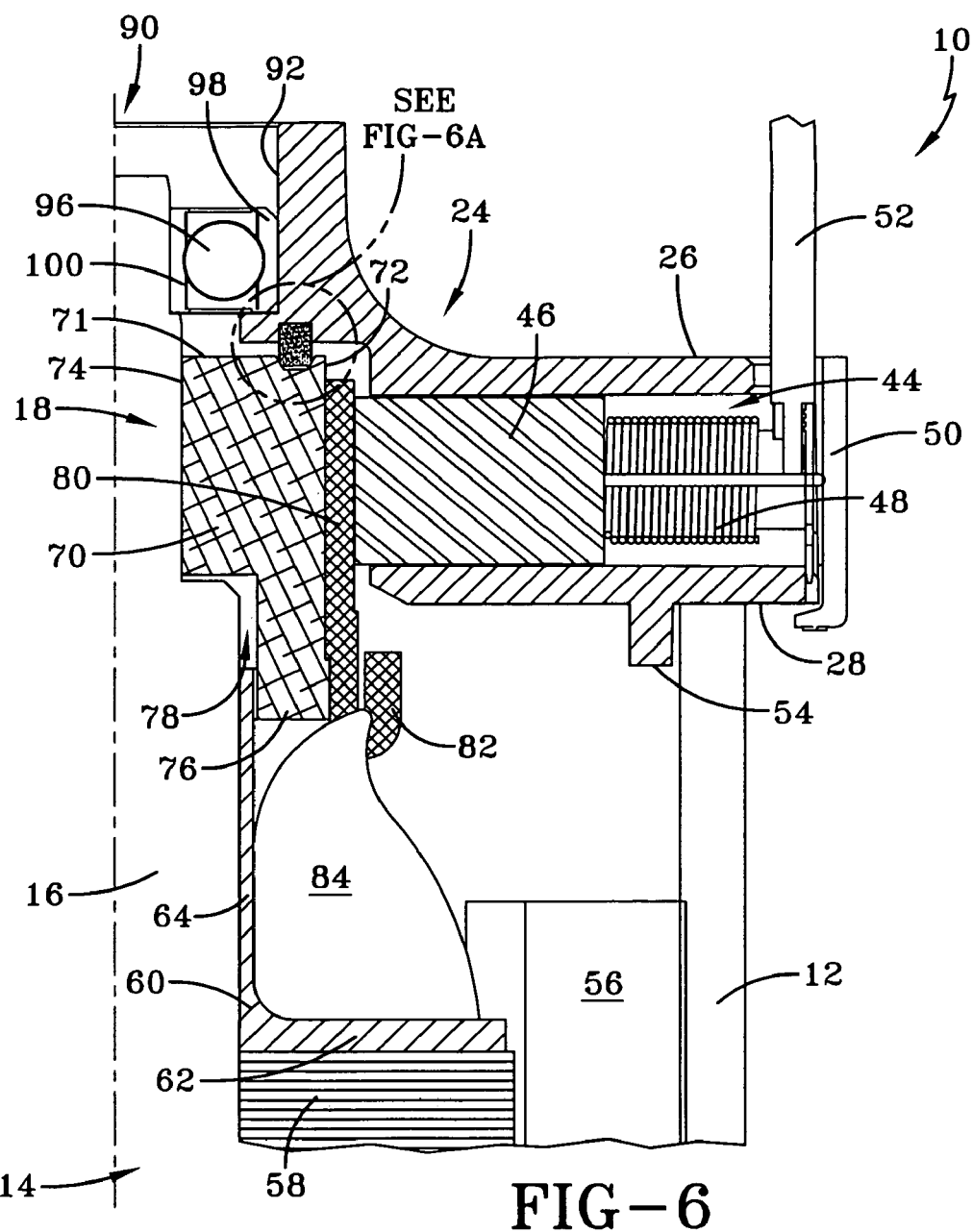
FIG. 6 is a partial cross-sectional view of the end bracket assembly incorporating a first alternative bearing seal.
FIG. 6A is a detailed illustration of the first alternative bearing seal.
Figure 7:
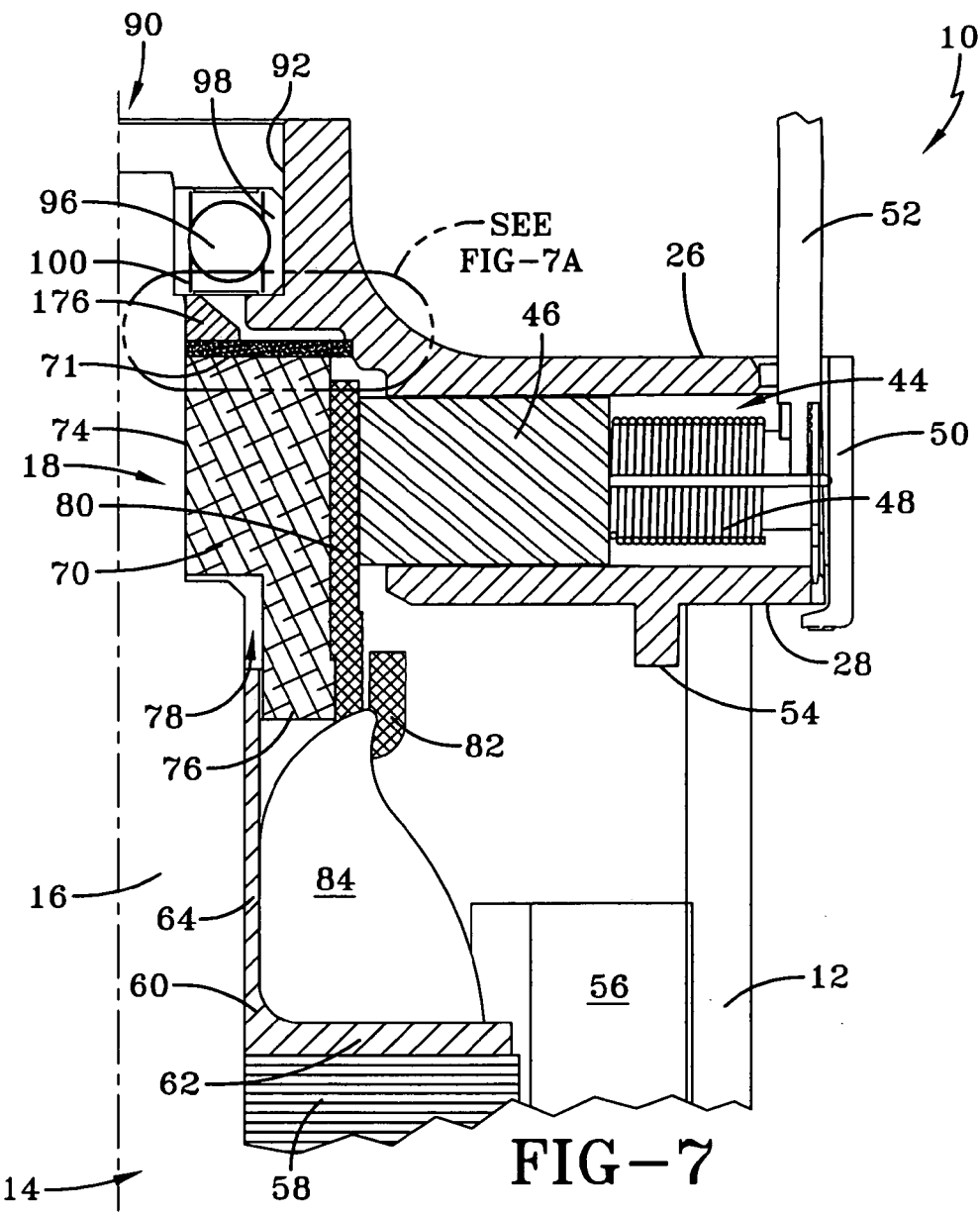
FIG. 7 is a partial cross-sectional view of the end bracket assembly incorporating a second alternative bearing seal.

Referring now to FIGS. 5–7, it will be appreciated that a dielectric seal or commutator/bearing seal may be provided between the end bearing 96 and the brush/commutator bar interface. In particular, the dielectric seal is designated generally by the numeral 150. In this embodiment, the seal configuration is provided by the end bracket assembly 24 which has a bracket underside surface 152 that faces the core face surface 71. The underside surface 152 includes a concentric groove 154 that receives and captures a seal 156 in the form of an O-ring. Accordingly, as the armature assembly and the commutator rotate, the O-ring is in slidable contact with the core face surface 71 and precludes the migration of any dust generated from the brush and the commutator bar interface from passing through to the end bearing 96. As in the previous embodiments, the seal 156 is made from a polymeric material such as expanded polytetrafluourethylene.

Referring now to FIGS. 6 and 6A, it can be seen that an alternative dielectric or commutator/bearing seal arrangement is designated generally by the numeral 160. In this particular embodiment, the core face surface 71 includes a face channel 164. Accordingly, a seal 166 is retained in the groove 154 and the seal 166 is received within the face channel 164. In this particular embodiment, it can be seen that the seal 166 is of a rectangular cross-section and is carried and captured by the groove 154 in an appropriate manner. The face channel 164 is chamfered on both sides at the bottom of the channel and as such provides for engaging contact with the seal 166 which, as in the previous embodiments, is made from a polymeric material such as expanded polytetrafluoroethylene. Such an arrangement of the dielectric seal 160 provides a circuitous path that further prevents dust from migrating from the brush/commutator bar interface toward the bearing 96.

Figure 7A:
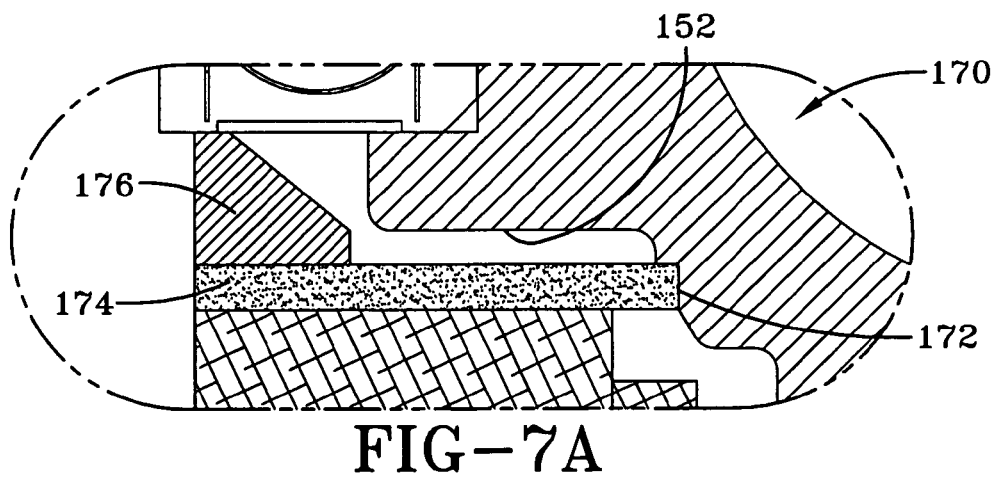
FIG. 7A is a detailed illustration of the second alternative bearing seal.

Referring now to FIGS. 7 and 7A, it can be seen that a dielectric or commutator/bearing seal made in accordance with an alternative embodiment of the present invention is designated generally by the numeral 170. In this particular embodiment, the bracket underside surface 152 provides a washer notch 172. A washer 174, which is made from expanded polytetrafluoroethylene or other polymeric material, is disposed on the core face surface 71 and is retained between the bearing 96 and the surface 71 by a spacer 176. The spacer 176 is secured to the shaft and, as such, the washer 174 rotates as the shaft rotates. The washer 174 is of a similar construction as the ring 118 and provides an outer radial surface that engages the bracket underside surface 152 and in particular the washer notch 172. Accordingly, another construction is provided that prevents the migration of dust toward the bearing 96. This dielectric seal 170 is distinguishable from the other seals 150 and 160 inasmuch as the seal is secured to the rotating components and engages or is in slidable contact with the stationary component of the end bracket assembly.

Referring back to FIG. 2, it can be seen that the inner ring 34 in conjunction with the commutator provides for a brush/commutator chamber 180. In particular, the chamber is defined by an inner ring surface 181 formed by the inner ring 34, the commutator, the commutator bars, and the respective seals above and below the commutator bar/brush interface. The inner ring surface 181 includes a dust reservoir which may be in the form of a plurality of inner ring grooves 182 each of which is defined by a groove back wall 184 that is connected to opposed groove side walls 186. Accordingly, as the commutator rotates and dust is generated by virtue of contact with the brushes, a plurality of dust particles 190 collect in the grooves 182. The dust particles become compacted and are retained within the grooves and are less inclined to migrate outside of the chamber 180 toward the seals. And in the event the dust particles migrate beyond the grooves, it will be appreciated that the seal configurations above and below the brush/commutator interface retain the dust particles in the chamber.

Based upon the foregoing, the advantages of the constructions described above are readily apparent. In particular, the seals are configured such as to provide engaging contact with the rotating or stationary parts so that no clearance gaps are provided. As such, the dust is contained within a confined area, and eventually settles in grooves within a chamber so as to prevent dust from migrating away from the brush/commutator bar interface. This significantly minimizes the possibility of arcing between the brushes and other components within the motor housing assembly.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A motor assembly, comprising:
   a commutator having a shaft extending axially therefrom;
   a commutator end bracket assembly;
   at least two brushes carried by said commutator end bracket assembly and in contact with said commutator; and
   a seal carried by one of said commutator and said commutator end bracket assembly and having engaging contact with the other of said commutator and said commutator end bracket assembly.

2. The motor assembly according to claim 1, wherein said seal is made of expanded polytetrafluoroethylene.

3. The motor assembly according to claim 2, wherein said seal is carried by said commutator end bracket assembly.

4. The motor assembly according to claim 2, wherein said commutator has a plurality of commutator bars that slidably contact said at least two brushes during rotation of said commutator, said seal slidably contacting said plurality of commutator bars.

5. The motor assembly according to claim 4, further comprising:
   a seal cover, said seal cover securing said seal to said end bracket assembly.

6. The motor assembly according to claim 5, further comprising:
   a seal seat disposed about said plurality of commutator bars, said seal having engaging contact with said seal seat.

7. The motor assembly according to claim 6, wherein said seal seat comprises a seat sleeve disposed about said plurality of commutator bars and a seat lip radially extending from said seal seat, said seal having engaging contact with at least one of said seat sleeve and said seat lip.

8. A motor assembly comprising:
   a commutator having a shaft extending axially therefrom;
   an armature assembly affixed to said shaft;
   a commutator end bracket assembly;
   at least two brushes carried by said commutator end bracket assembly and in contact with said commutator;
   a seal carried by one of said commutator and said commutator end bracket assembly and having engaging contact with the other of said commutator and said commutator end bracket assembly, said seal disposed between said at least two brushes and said armature assembly.

9. The motor assembly according to claim 8, wherein said seal is carried by said commutator end bracket assembly.

10. The motor assembly according to claim 8, wherein said commutator has a plurality of commutator bars that slidably contact said at least two brushes during rotation of said commutator, said seal slidably contacting said plurality of commutator bars.

11. The motor assembly according to claim 10, further comprising:
    a seal cover, said seal cover securing said seal to said end bracket assembly.

12. The motor assembly according to claim 11, further comprising:
    a seal seat disposed about said plurality of commutator bars, said seal having engaging contact with said seal seat.

13. The motor assembly according to claim 12, wherein said seal seat comprises a seat sleeve disposed about said plurality of commutator bars and a seat lip radially extending from said seal seat, said seal having engaging contact with at least one of said seat sleeve and said seat lip.

14. A motor assembly, comprising:
    a commutator having a shaft extending axially therefrom;
    a commutator end bracket assembly;
    a bearing disposed between said shaft and said commutator end bracket assembly;
    at least two brushes carried by said commutator end bracket assembly and in contact with said commutator; and
    a seal carried by one of said commutator and said commutator end bracket assembly and having engaging contact with the other of said commutator and said commutator end bracket assembly, said seal disposed between said at least two brushes and said bearing.

15. The motor assembly according to claim 14, wherein said commutator comprises a core having an exterior surface facing said brush and a face surface radially extending from said exterior surface toward said shaft; and
    wherein said commutator end bracket assembly comprises a bracket underside surface which faces said core face surface, said seal contacting both said bracket underside surface and said core face surface.

16. The motor assembly according to claim 15, wherein said bracket underside surface provides a groove which captures said seal.

17. The motor assembly according to claim 16, wherein said core face surface provides a face channel aligned with said groove, said seal slidably received in said face channel.

18. The motor assembly according to claim 15, further comprising:
    a spacer secured to said shaft, said seal captured between said spacer and said core face surface.

19. The motor assembly according to claim 18, wherein said seal is washer-shaped, and wherein said bracket underside surface provides a washer notch, said washer-shaped seal slidably received in said washer notch.

20. A motor assembly, comprising:
    a commutator having a shaft extending axially therefrom;
    a commutator end bracket assembly;
    an armature assembly affixed to said shaft;
    a bearing disposed between said shaft and said commutator end bracket assembly;
    at least two brushes carried by said commutator end bracket assembly and in contact with said commutator;
    a commutator/bearing seal carried by one of said commutator and said commutator end bracket assembly and having engaging contact with the other of said commutator and said commutator end bracket assembly; and
    a commutator/armature seal carried by one of said commutator and said commutator end bracket assembly and having engaging contact with the other of said commutator and said commutator end bracket assembly said seals, and said commutator end bracket assembly forming an enclosed chamber for collecting dust from said brush.

21. The motor assembly according to claim 20, wherein said commutator has a plurality of commutator bars that slidably contact said at least two brushes during rotation of said commutator, said commutator/armature seal slidably contacting said plurality of commutator bars.

22. The motor assembly according to claim 21, further comprising:
a commutator/armature seal cover, said commutator/armature seal cover securing said commutator/armature seal to said end bracket assembly.

23. The motor assembly according to claim 22, further comprising:
a commutator/armature seal seat disposed about said plurality of commutator bars, said commutator/armature seal having engaging contact with said seal seat;
wherein said seal seat comprises a seat sleeve disposed about said plurality of commutator bars and a seat lip radially extending from said seat sleeve, said commutator/armature seal having engaging contact with at least one of said seat sleeve and said seat lip.

24. The motor assembly according to claim 21, wherein said commutator comprises a core having an exterior surface facing said at least one brush and a face surface radially extending from said exterior surface toward said shaft; and
wherein said commutator end bracket assembly comprises a bracket underside surface which faces said core face surface, said commutator/bearing seal contacting both said bracket underside surface and said core face surface.

25. The motor assembly according to claim 21, wherein said bracket underside surface provides a groove which captures said commutator/bearing seal, and wherein said core face surface provides a face channel aligned with said groove, said commutator/bearing seal slidably received in said face channel.

26. The motor assembly according to claim 21, further comprising:
a spacer secured to said shaft, said seal captured between said spacer and said core face surface and wherein said seal is washer-shaped, and wherein said bracket underside surface provides a washer notch, said washer-shaped seal slidably received in said washer notch.

* * * * *